(12) United States Patent
Garric

(10) Patent No.: US 6,871,819 B2
(45) Date of Patent: Mar. 29, 2005

(54) PROTECTION DEVICE FOR A JET ENGINE AIR INTAKE STRUCTURE

(75) Inventor: Stéphane Garric, Balma (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/783,626

(22) Filed: Feb. 20, 2004

(65) Prior Publication Data

US 2004/0195437 A1 Oct. 7, 2004

(30) Foreign Application Priority Data

Feb. 28, 2003 (FR) .......................................... 03 02459

(51) Int. Cl.[7] ................................................ B64C 1/00
(52) U.S. Cl. ....................... 244/53 B; 244/1 R; 244/121
(58) Field of Search ............................ 244/53 B, 129.4, 244/132, 1 R, 121; 150/157–168; 206/319; 215/41; 138/89, 96 R; 60/39.092

(56) References Cited

U.S. PATENT DOCUMENTS

| 2,417,636 A | * | 3/1947 | Ditzler et al. ............ 126/110 R |
| 2,705,208 A | * | 3/1955 | Schweikert ................... 60/685 |
| 2,744,385 A |   | 5/1956 | Sokol et al. |
| 2,804,903 A | * | 9/1957 | Davis .......................... 150/157 |
| 3,242,672 A |   | 3/1966 | Keen |
| 3,548,930 A | * | 12/1970 | Byrd ...................... 165/104.26 |
| 3,646,980 A |   | 3/1972 | Peterson |
| 4,290,569 A |   | 9/1981 | McIntyre |
| 4,376,546 A | * | 3/1983 | Guccione et al. ............ 280/770 |
| 4,413,653 A | * | 11/1983 | Carter, Jr. ..................... 138/89 |
| 4,424,004 A | * | 1/1984 | Hiskes ..................... 416/244 A |
| 4,606,516 A | * | 8/1986 | Willison ....................... 244/121 |
| 4,867,216 A | * | 9/1989 | McKee ......................... 150/166 |
| D303,784 S | * | 10/1989 | Micallef ..................... D12/345 |
| 4,997,229 A | * | 3/1991 | Swanson ............... 296/136.08 |
| 5,056,817 A | * | 10/1991 | Fuller .......................... 280/770 |
| 5,114,098 A | * | 5/1992 | Campbell ..................... 244/121 |
| 5,143,321 A |   | 9/1992 | Jackson |
| 5,167,267 A | * | 12/1992 | McQuaid ..................... 150/166 |
| 5,274,988 A | * | 1/1994 | Bruce .......................... 56/17.4 |
| 5,356,191 A | * | 10/1994 | Sheehan ...................... 296/95.1 |
| 5,497,819 A | * | 3/1996 | Chiang ......................... 150/166 |
| 5,775,722 A | * | 7/1998 | Moore et al. ................ 280/727 |
| 5,845,958 A | * | 12/1998 | Rudys et al. ........... 296/136.08 |
| 5,944,347 A | * | 8/1999 | Pechman ...................... 280/770 |
| 6,332,853 B1 | * | 12/2001 | Bowman ..................... 474/146 |
| 6,371,547 B1 | * | 4/2002 | Halbrook ............... 296/136.07 |
| 6,491,280 B1 | * | 12/2002 | Fishman ...................... 248/683 |
| 6,547,313 B2 | * | 4/2003 | Syron .......................... 118/505 |
| 6,607,235 B2 | * | 8/2003 | McGrath, Jr. ............ 296/136.1 |
| 2002/0070129 A1 | * | 6/2002 | Tunstall-Behrens ......... 206/204 |

FOREIGN PATENT DOCUMENTS

GB          2 279 052 A      12/1994

OTHER PUBLICATIONS

Bruce's Custom Covers, "Aircraft CoversGeneral Info" pp. 1–7.*
King Bag and Manufacturing, "Aviation Products . . . "; pp. 6/6; Feb. 7, 2003.*
Bruce's Custom Covers Technical Sheet; pp. 1–8, Feb. 10, 2003, Boeing KC135.*
Bruce's Custom Covers, Boeing 737–300 (U.S. Mil. C–40), 2 pages.*
Bruce's Custom Covers, McDonnell–Douglas F–15 Eagle, pp 1–4.*

* cited by examiner

*Primary Examiner*—Teri Pham Luu
*Assistant Examiner*—Stephen A. Holzen
(74) *Attorney, Agent, or Firm*—Thelen Reid & Preist, LLP

(57) ABSTRACT

This invention relates to a protection device (30) for an air intake structure (6) of a jet engine (1), said structure comprising an air intake cowl (8) and an air intake lip (10) that jointly delimit a fan case ducting (12), the cowl having a top portion provided with at least one ventilation scoop (20) and the lip defining a fan case ducting intake (14), the device comprising a protective tarpaulin (32) with a main portion (34) designed to close off the intake (14) when the device is assembled on the structure (6). According to the invention, the protective tarpaulin also comprises a secondary portion (40) fixed to the main portion, said secondary portion being provided with stiffening means (42) and designed to partially cover the cowl (8), to close off each ventilation scoop.

11 Claims, 3 Drawing Sheets

PROTECTION DEVICE FOR A JET ENGINE AIR INTAKE STRUCTURE

CROSS-REFERENCE TO RELATED APPLICATION

This application claims priority to French Application No. 03 02459, filed on Feb. 28, 2003, entitled: "Protection Device for a Jet Engine Air Intake Structure" and was not published in English.

1. Technical Domain

This invention relates generally to the domain of protection for a jet engine air intake structure installed on an aircraft. This protection is intended particularly to be assembled on the engine during long term aircraft storage phases, in order to prevent access inside the engine.

2. State of Prior Art

FIG. 1 shows a conventional jet engine 1 designed to be installed on an aircraft (not shown) wing, through a mast 2 fixed to a nacelle 4 for this jet engine.

The front part of the nacelle 4 includes an air intake structure 6 composed of an air intake cowl 8, prolonged by an air intake lip 10. Note that the cowl 8 and the lip 10 jointly delimit the outside of an annular fan case ducting 12, for which an intake 14 is defined by the lip 10.

Thus, during long term aircraft storage phases, for example during the night, this intake 14 to the fan case ducting 12 needs to be closed off to prevent the entry of objects into the engine 1.

To achieve this, a protective tarpaulin 16 is provided designed to be assembled on the air intake structure 6, so as to cover the entire intake 14 to the fan case ducting 12. Normally, the protective tarpaulin 16 is in the form of a disk and is fitted with fasteners 18 spaced around the circumference, these fasteners 18 being designed to cooperate with complementary fasteners (not shown) also arranged circumferentially around the air intake cowl 8 closed to the junction with the lip 10. Note that this protective tarpaulin 16 on the air intake structure 6 is then assembled using an elevating platform, necessary at least for attachment of the tarpaulin 16 onto the top portion of the structure 6.

Furthermore, the air intake structure 8 supports a ventilation scoop 20 of a ventilation duct (not shown), the ventilation duct passing through the air intake structure 6 of the engine 1.

Therefore, the ventilation scoop 20 placed on the top portion of the air intake cowl 8 also needs to be closed off during long term storage phases of the aircraft such that various objects, water or even birds cannot enter the ventilation duct.

A single cap 22 is usually provided to close off the ventilation scoop 20, that is designed to be assembled by operators located on the elevating platform used for fixing the protective tarpaulin 16.

However, it is noted that the ventilation scoop 20 is at a relatively long distance from the end of the air intake lip 10, this distance normally being equal to at least 1.50 m. Consequently, in order to carry out the operation to assemble the cap 22 on the ventilation scoop 20, an operator located on the elevating platform normally needs to lie down full length on the top portion of the air intake cowl 8.

Obviously, this introduces serious safety problems for the operator performing this task, and risks of this operator falling are high due to the very uncomfortable position. Moreover, the risks arising as a result of this assembly may strongly discourage operators from performing the task. Consequently, if the ventilation scoop 20 is not closed off before a long term storage phase of the aircraft, particularly dangerous situations can arise in which harmful elements have actually entered the ventilation duct.

Furthermore, since the operator is obliged to lie down on the air intake structure 6, he can accidentally scratch the outside surface of the structure, for example by scratching the paint on the cowl 8 and on the lip 10 with his belt.

Another disadvantage due to the presence of such a cap 22 is due to the fact that when it is assembled on the ventilation scoop 20, this cap 22 is not visible to operators performing tasks to prepare the aircraft for flight phase. Thus, its presence could easily be forgotten and consequently cause blockage of the ventilation duct.

Still with reference to FIG. 1, it can be seen that in its lower portion close to the air intake lip 10, the air intake cowl 8 is provided with a setback area 24 in which one or several outlet orifices (not shown) of a hot air duct (not shown) are located, this hot air duct being useful for defrosting the air intake structure 6 of the engine 1.

Once again, during long term storage phases of the aircraft, all of the exhaust orifices are to be closed off to prevent objects or birds from entering into the hot air duct.

A simple closing cap 26 is also provided for this purpose, covering the entire area 24 on the lower portion of the air intake cowl 8.

If the specific location of exhaust orifices makes it easier to assemble the cap 26 than to assemble the cap 22 to close off the ventilation scoop 20, there is also a risk that the operator will forget to remove this plug 26 during preparation of the aircraft for a flight phase.

As can be seen, there are major disadvantages with the protection of the engine air intake structure traditionally provided in prior art. Another disadvantage is the fact that the large number of protection elements to be provided introduces serious risks of loss of some of these elements, particularly for closing caps that are small parts.

Finally, it is noted that since protection is necessary during all long term aircraft storage phases, the various protection elements have to be placed in the cargo compartment for each flight of this aircraft. Thus, a storage case is required for these various elements, which naturally introduces constraints in terms of mass and size.

OBJECT OF THE INVENTION

Therefore, the purpose of the invention is to propose a protection device for a jet engine air intake structure, the device at least partially correcting the disadvantages mentioned above related to embodiments according to prior art.

To achieve this, the purpose of the invention is a protection device for a jet engine air intake structure, the structure comprising an air intake cowl and an air intake lip that, jointly with the cowl, delimit a fan case ducting, the cowl having a top portion provided with at least one ventilation scoop and the lip defining a fan case ducting intake, the device comprising a protective tarpaulin with a main portion designed to close off the fan case ducting intake when the device is assembled on the engine air intake structure. According to the invention, the protective tarpaulin also comprises a secondary portion fixed to the main portion, the secondary portion being provided with stiffening means and designed to partially cover the engine air intake cowl, to close off each ventilation scoop.

Advantageously, the secondary portion of the protective tarpaulin is also stiffened by the stiffening means, so that it can be brought into and kept in a predetermined shape, preformed to match the part of the top portion of the air intake cowl on which the ventilation scoop is located. Thus, when the secondary portion of the protective tarpaulin is correctly positioned on the top portion of the air intake cowl, the covered ventilation scoop is closed off and consequently prevents any intrusion into the ventilation duct.

Thus, with this type of protective tarpaulin of the device according to the invention, an operator located on the elevating platform can thus easily throw the rigid secondary portion so that it covers the part of the cowl on which the ventilation scoop is located, for example after the operator has assembled the main portion of this tarpaulin in a conventional manner, in order to protect the fan case ducting intake.

The simplicity of these operations to install the device according to the invention is an another advantage, apart from the fact that the operator responsible for closing off the ventilation scoop is no longer obliged to lie down on the engine air intake structure, but on the contrary can control everything from a stable and safe position on the elevating platform. Risks of accidents related to this operator falling are therefore much reduced, and the risks of damaging the outside surface of the engine air intake structure by scratching it are also reduced.

Furthermore, the fact that the protection means used to close off the ventilation scoop are fixed to the means used to close off the fan case ducting intake, introduce significant advantages compared with embodiments suggested in prior art.

Firstly, it is noted that the ventilation scoop is directly released when the protective tarpaulin is removed from the engine. Consequently, the risks of forgetting to remove the protective tarpaulin from this scoop are almost entirely eliminated, since the presence of this protective tarpaulin depends entirely on the presence of the protection of the fan case ducting intake, which is clearly visible to operators located on the ground.

Furthermore, the permanent connection between the secondary portion and the main portion of the protective tarpaulin considerably reduces risks of losing the various elements used.

Preferably, the stiffening means fitted on the secondary portion of the protective tarpaulin are prolonged in the main part of this tarpaulin. The direct consequence of this arrangement is that the junction between the main portion of the secondary portion of the protective tarpaulin is practically rigid. In this way, when the main portion is assembled and the secondary portion of the protective tarpaulin is thrown onto the air intake cowl, it is guaranteed that it will be in an appropriate position on this cowl.

Preferably, the stiffening means comprise several rigid preformed strips preformed to match the curve of the air engine air intake structure, such that the protective tarpaulin according to the device matches this structure as well as possible, and that risks of intrusion of any elements into the ventilation duct are practically zero. It is noted that the rigid strips are preferably arranged such that the secondary portion of the protective tarpaulin is foldable, thus considerably reducing the size of the protection device that will be stored in the aircraft cargo compartment.

In this configuration, it is possible that the rigid strips should also be arranged such that when the device is assembled on the engine air intake structure, they form rows approximately parallel to a main longitudinal axis of this engine. It is noted that in order to obtain a foldable secondary portion, each row may be composed of several rigid strips arranged one after the other along the same line, the parts of the protective tarpaulin located between two directly adjacent strips then being advantageously used as a folding area.

Furthermore, the rigid strips, that are preferably metallic, may be incorporated into the protective tarpaulin of the device, this tarpaulin preferably being made of fabric. The protection device thus configured cannot damage the outside surface of the engine air intake structure, particularly by scratching it.

Preferably, the main portion of the protective tarpaulin is approximately in the shape of a disk, and the secondary portion of this tarpaulin is approximately in the shape of a band, one end of the secondary portion being connected to the main portion around the circumference of this main portion.

In this respect, the protective tarpaulin can be designed such that when the device is assembled on the engine air intake structure, the circumference of the main portion of the protective tarpaulin is close to a junction between the air intake cowl and the air intake lip on the engine air intake structure.

The protection device can also comprise attachment straps for the secondary portion, the straps being connected to the other end of the secondary portion, and capable of surrounding the air intake cowl of the engine air intake structure. Thus, these straps can advantageously overcome the harmful effects that could be caused by wind on the secondary portion of the tarpaulin, such as lifting the tarpaulin to enable intrusion of elements inside the ventilation duct.

Still preferably, the protective tarpaulin also comprises a tertiary portion fixed to the main portion, the tertiary portion being provided with stiffening means and designed to partially cover the engine air intake cowl, to close off each exhaust orifice forming part of a hot air duct and also provided on a lower portion of the air intake cowl.

Thus, the three critical locations of the engine air intake structure (the fan case ducting intake, the ventilation scoop and the exhaust orifices) are protected and this can be done using a single tarpaulin for which all portions are fixed together.

In this way, apart from the very small risk of any of the various protection elements getting lost, the device no longer requires a storage case, such that mass and size constraints related to the presence of this type of case and used in prior art, no longer exist. The device consisting solely of the protective tarpaulin and various attachment means provided to assemble it on the engine air intake structure, may advantageously be in the form of a single piece that can easily be folded and then directly placed in the dog compartment of the aircraft.

Other advantages and characteristics of the invention will become clearer after reading the detailed non-limitative description given below.

BRIEF DESCRIPTION OF THE DRAWINGS

This description will be made with regard to the attached drawings among which.

DETAILED DESCRIPTION OF A PREFERRED EMBODIMENT

Figure 1:
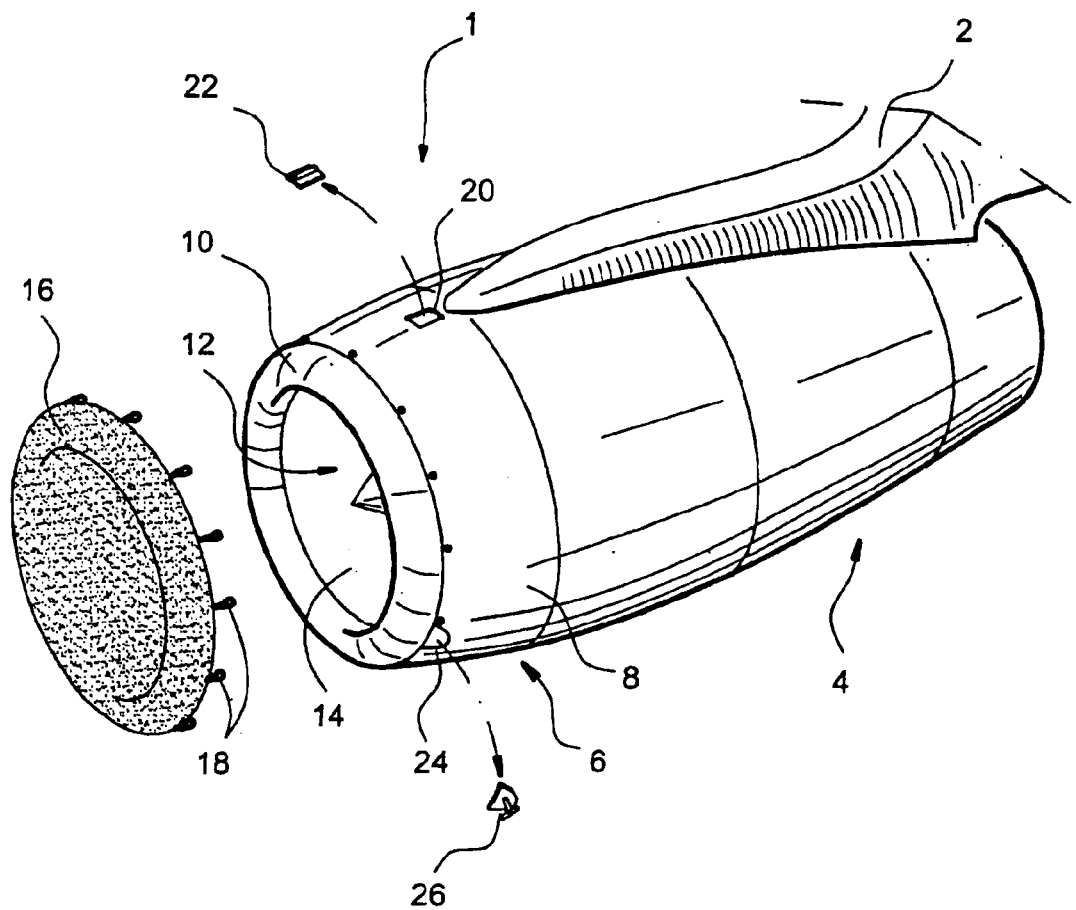
FIG. 1, already described, shows a partially exploded perspective view of an aircraft jet engine fitted with conventional protection means for the engine air intake structure.
Figure 2:
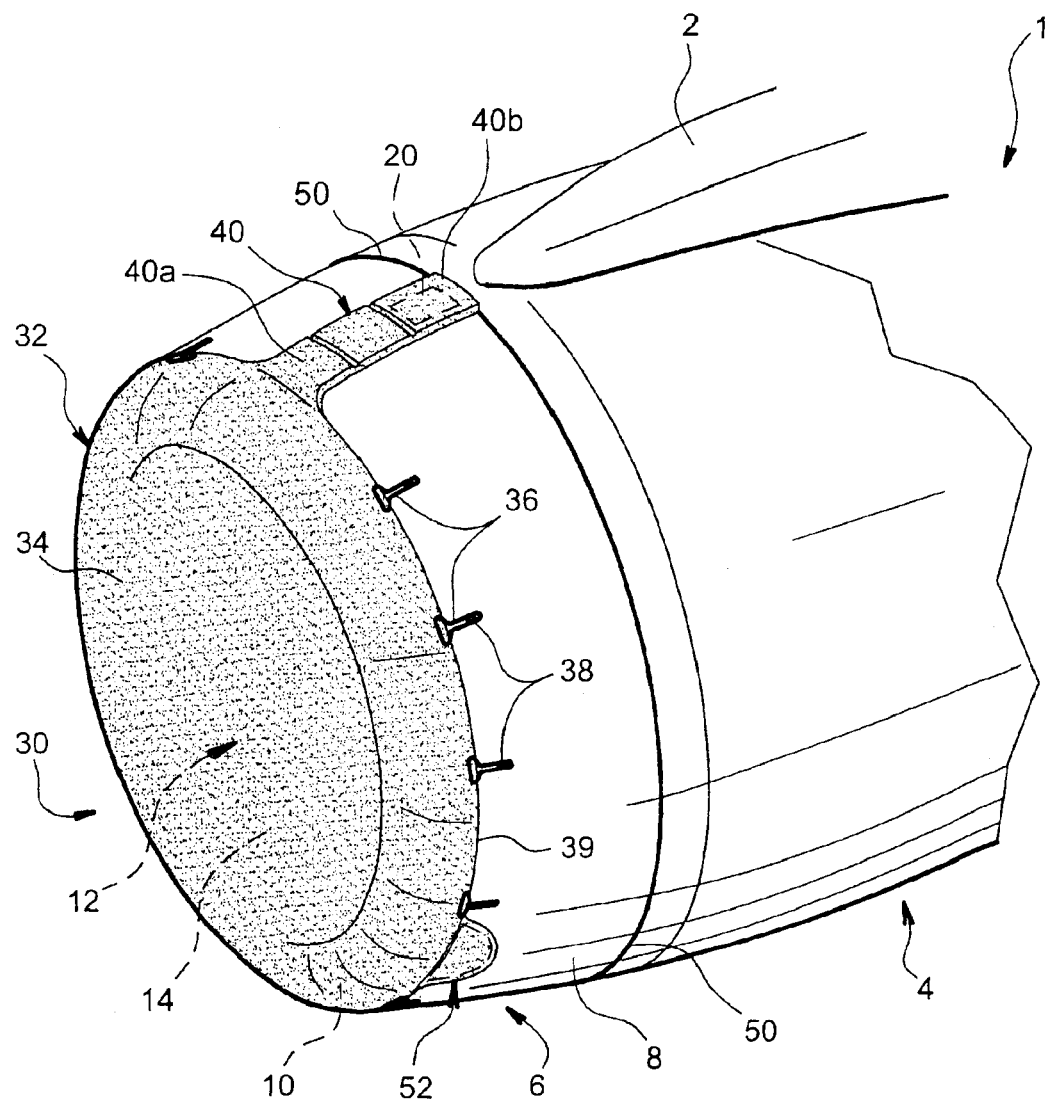
FIG. 2 shows a partial perspective view of the engine shown on FIG. 1, a protection device according to a preferred embodiment of this invention being assembled on the air intake structure for this engine.

FIG. 2 shows an air intake structure 6 for a conventional jet engine 1, designed to be installed on an aircraft (not shown) through a mast 2 fixed to a nacelle 4 of the engine, the engine being practically the same as that shown in FIG. 1 described above.

Consequently, it can be seen in this FIG. 2 that elements with the same numeric references as the references attached to elements shown in FIG. 1, correspond to identical or similar elements.

Thus, the air intake structure 6 located at the front of the nacelle 4 is composed of an air intake cowl 8 provided with a ventilation scoop 20 on its top portion, this scoop 20 forming part of a ventilation duct (not shown). It is noted that the ventilation scoop 20 is usually located at the top part of the air intake cowl 8, approximately along the line of the mast 2.

Furthermore, the cowl 8 also comprises one or several exhaust orifices (not shown in FIG. 2) forming part of a hot air duct (not shown), these exhaust orifices being provided on a lower portion of the air intake cowl 8.

The air intake structure 6 also comprises an air intake lip 10, continuous with the line of the cowl 8, this lip 10 being designed to share air between the part that penetrates inside the engine 1 and the part that flows around the nacelle 4.

Furthermore, the air intake cowl 8 and the air intake lip 10 jointly delimit the outside of an annular fan case ducting 12, for which an intake 14 is defined by the lip 10.

Still with reference to FIG. 2, the figure shows a protection device 30 according to a preferred embodiment of this invention. In particular, this device 30 may be assembled on the air intake structure 6 during long term aircraft storage phases in order to avoid the entry of any elements inside the engine 1, through the ventilation scoop 20, the exhaust orifices or the intake 14 of the fan case ducting 12.

The protection device 30 is essentially provided with a protective tarpaulin 32, preferably made of fabric, of which a main portion 34 is designed to close off the intake 14 to the fan case ducting 12.

This main portion 34 is preferably in the shape of a disk, an annular end part being provided with fasteners 36 arranged circumferentially, these fasteners 36 forming an integral part of the device 30 and being arranged so as to be able to cooperate with complementary fasteners 38 also provided circumferentially around the air intake cowl 8, close to the junction with the lip 10.

Thus, when the main portion 34 of the protective tarpaulin 32 has been assembled on the structure 6 using fasteners 36 and 38, the annular end part of this main portion 34 matches the lip 10, such that the intake 14 to the fan case ducting 12 is fully closed off.

Furthermore, as an example given for information and as can be seen in FIG. 2, it is possible that once the main disk shaped portion 34 is installed on the structure 6, it is approximately tight and its circumference 39 is located close to the junction between the air intake cowl 8 and the air intake lip 10. In this way, the closure reliably prevents intrusion of objects inside the fan case ducting 12 of the engine 1.

Furthermore, the protective tarpaulin 32 comprises a secondary portion 40, fixed to the main portion 34. The secondary portion 40, preferably in the shape of a band, is designed to partially cover the top portion of the air intake cowl 8, so as to close off the ventilation scoop 20 and consequently prevent the intrusion of objects, birds or water inside the ventilation duct.

As can be seen in FIG. 2, the secondary portion 40 in the shape of a band is provided with a first end 40a connected to the main portion 34 at the circumference 39 of the main portion, and a second end 40b designed so as to extend beyond the ventilation scoop 20 when the main portion 34 and the secondary portion 40 are assembled on the structure 6.

Figure 3:
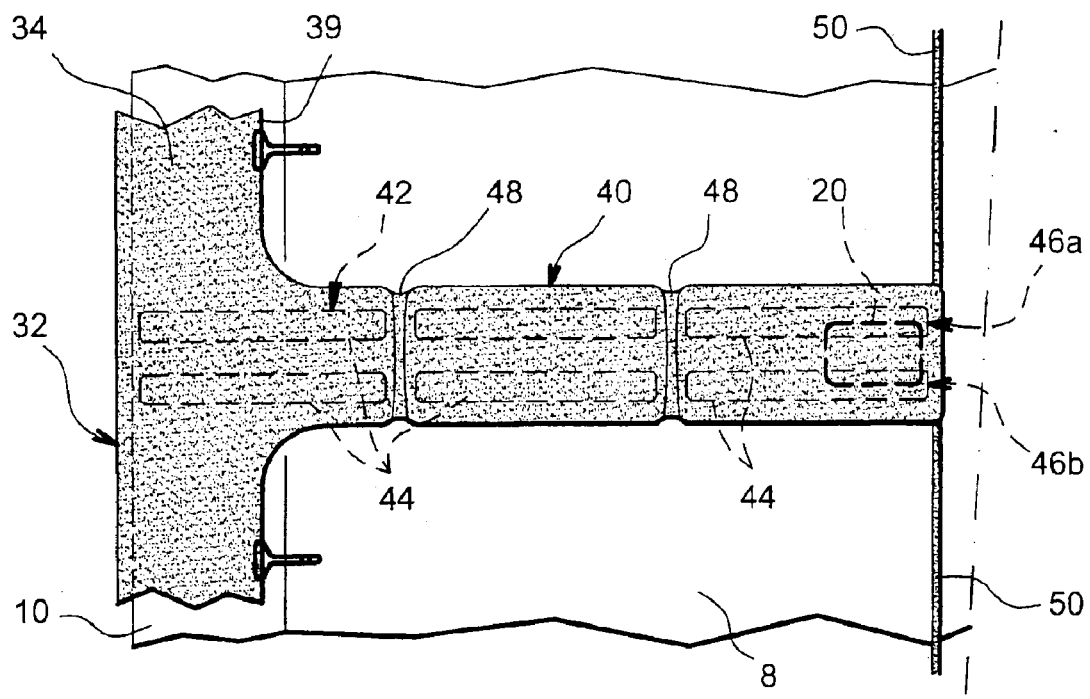
FIG. 3 shows a partial top view of FIG. 2, and, FIG. 4 shows a partial bottom view of FIG. 2.

With reference to FIGS. 2 and 3 combined, the secondary portion 40 of the protective tarpaulin 32 is provided with stiffening means 42, which enable this portion 40 to be brought into contact with the air intake cowl 8. In other words, the stiffening means 42 stiffen the fabric from which the portion 40 is made so that it adopts a given configuration, designed so that once it is thrown onto the structure 6, at least most of the secondary portion 40 satisfactorily matches the cowl 8 and consequently prevents access to the ventilation scoop 20.

In this preferred embodiment, the stiffening means 42 are composed of several rigid strips 44, preferably metallic and preformed to match the curve of the air intake structure 6. In this way, the secondary portion 40 of the tarpaulin 32 is capable of very precisely matching the shape of the cowl 8, particularly due to the weight of the rigid strips 44 which satisfactorily makes the fabric match the shape of the outside surface of this cowl 8.

It is noted that the rigid strips 44 can be incorporated into the protective tarpaulin 32, for example by inserting them in closed spaces (not shown) delimited by two superposed layers of fabric forming the tarpaulin 32, to prevent risks of damage to the outside surface of the air intake cowl 8 by scratching.

In this preferred embodiment of the invention, the rigid strips are designed not only to equip the secondary portion 40 of the tarpaulin 32, but also extend as far as the annular end portion of the main portion 34 that is designed to come into contact with the air intake lip 10 when the protection device 30 is assembled on the structure 6.

Consequently, the part of the annular end portion equipped with rigid strips 44 and the first end 40a of the secondary portion 40 together form an approximately rigid area. Consequently, when the main portion 34 of the tarpaulin 32 is actually assembled on the structure 6 of the engine 1, this portion 34 kept tight by the fasteners 36 and 38 induces an imposed position for the annular end portion, and therefore also an imposed position for the end 40a connected fairly rigidly to the annular end portion. Obviously, these imposed positions are adapted such that when the secondary portion 40 is thrown onto the cowl 8, it satisfactorily matches the outside surface of the cowl.

Note for guidance that the specific shape of the rigid strips 44, preformed to match the curve of lip 10 at the annular end portion and preformed to match the curve of the cowl 8 at the end 40a, also participates in placing this end 40a in the most appropriate possible position to close off the ventilation scoop 20.

More specifically with reference to FIG. 3, it can be seen that rigid strips 44 are in the shape of two rows 46a and 46b extending in a direction approximately parallel to a main longitudinal axis (not shown) of the engine 1, when the device 30 is assembled on the air intake structure 6. Obviously, the number and the position of the rows can be adapted as a function of the conditions encountered, without going outside the scope of the invention.

In this preferred embodiment of this invention, it can be seen that each of the two rows 46a and 46b comprises several rigid strips 44 arranged one after the other along the same center line. Consequently, these different strips 44 can be arranged so as to define folding areas 48 of the secondary portion 40, these folding areas 48 corresponding to strips of fabric extending approximately perpendicular to the direction of the rows 46a and 46b, and therefore approximately perpendicular to the main longitudinal axis of the engine 1.

Thus, when an operator is located on an elevating platform and has completed assembly of the main portion 34 of the protective tarpaulin 32 on the structure 6, he can easily grip the second end 40b of the secondary portion 40, and then throw it such that the portion 40 spreads out fully on the air intake cowl 8. Moreover, it is natural that making the secondary portion 40 foldable reduces the size of the protection device 30.

Moreover, as mentioned above, since the position of the first end 40a is practically fixed after the main portion 34 has been assembled, the operator only needs to ensure that the secondary portion 40 is fully unwound, and can then be certain that it satisfactorily covers the structure 6 and the ventilation scoop 20.

However, it would naturally be possible to make the secondary portion 40 in the shape of a non-foldable rigid portion, without going outside the scope of the invention.

The protection device 30 may include attachment straps 50 for the secondary portion 40, to make it impossible for this secondary portion 40 of the tarpaulin 32 to be lifted. These straps 50, preferably made from a non-abrasive material to avoid scratching the paint of the outside surface of the cowl 8, are fixed to the second end 40b of the portion 40 and are designed to surround the nacelle 4 before being connected to each other.

Note that the attachment straps 50 are preferably fixed onto or close to the part of the secondary portion 40 designed to cover the ventilation scoop 20, such that it is impossible for anything to enter into the ventilation duct.

Figure 4:
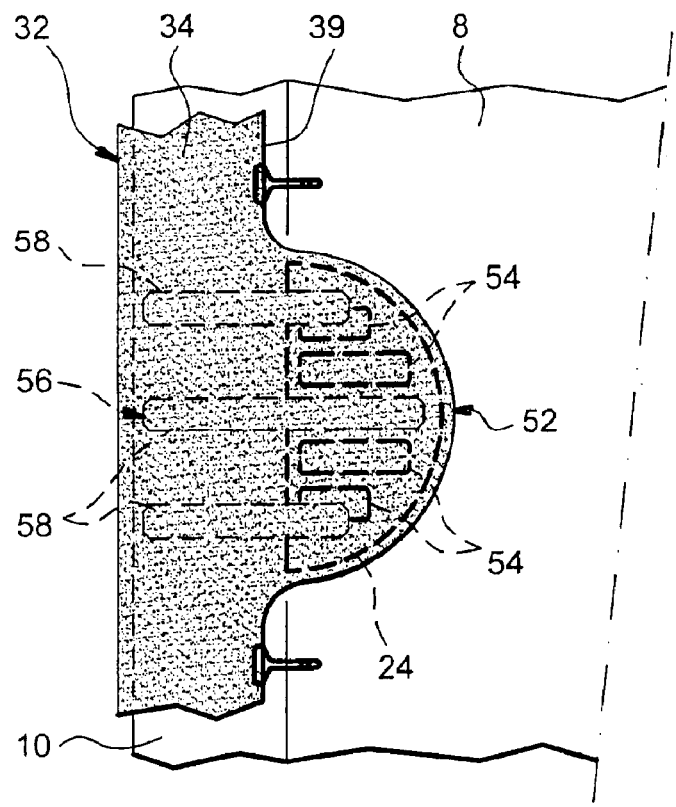

With reference to FIGS. 2 and 4, it can be seen that the protective tarpaulin 32 also comprises a tertiary portion 52 fixed to the main portion 34. The tertiary portion 52, preferably in the shape of a half-disk, is designed to partially cover the lower portion of the air intake cowl 8, so as to close off each exhaust orifice 54 and consequently prevent intrusion of objects or birds inside the hot air duct.

Note that this tertiary portion 52 is designed according to a principle similar to the principle of the secondary portion 40, with the difference that it is not foldable. The setback area 24 in which several exhaust orifices 54 are located can automatically be covered by the tertiary portion 52 when the main portion 34 is assembled on the structure 6.

This arrangement is possible due to the presence of stiffening means 56, which are preferably also in the shape of several rigid strips 58 preformed to match the curve of the structure 6, and each extending as far as the annular end portion of the main portion 34.

Obviously, a person skilled in the art could make various modifications to the protection device 30 that has just been described as a non-limitative example.

What is claimed is:

1. Protection device for an air intake structure of a jet engine, said structure comprising an air intake cowl and an air intake lip, that jointly delimit a fan case ducting with said cowl, the cowl having a top portion provided with at least one ventilation scoop and the lip defining a fan case ducting intake, the device comprising a protective tarpaulin with a main portion designed to close off the fan case ducting intake when the device is assembled on the engine air intake structure, characterized in that the protective tarpaulin also comprises a secondary portion fixed to the main portion, said secondary portion being provided with stiffening means and designed to partially cover the air intake cowl of the engine, to close off each ventilation scoop.

2. Protection device according to claim 1, characterized in that the stiffening means fitted on the secondary portion of the protective tarpaulin are prolonged in the main part of the said tarpaulin.

3. Protection device according to claim 1, characterized in that the stiffening means comprise several rigid strips preformed to match the curve of the air intake structure of the engine.

4. Protection device according to claim 3, characterized in that the rigid strips are arranged such that the secondary portion of the protective tarpaulin is foldable.

5. Protection device according to claim 3, characterized in that the rigid strips are arranged such that when the device is assembled on the air intake structure of the engine, they form rows approximately parallel to a main longitudinal axis of this engine.

6. Protection device according to claim 3, characterized in that the rigid strips are incorporated into the protective tarpaulin of the device.

7. Protection device according to claim 3, characterized in that the protective tarpaulin is made of fabric and in that the rigid strips are metallic.

8. Protection device according to claim 1, characterized in that the main portion of the protective tarpaulin is approximately in the shape of a disk, and in that the secondary portion of this tarpaulin is approximately in the shape of a band, one end of the said secondary portion being connected to the said main portion around the circumference of this main portion.

9. Protection device according to claim 8, characterized in that the protective tarpaulin can be designed such that when the device is assembled on the air intake structure of the engine, the circumference of the main portion of the protective tarpaulin is close to a junction between the air intake cowl and the air intake lip on the air intake structure of the engine.

10. Protection device according to claim 8, characterized in that the device also comprises attachment straps for said secondary portion, said straps being connected to the other end of said secondary portion, and capable of surrounding the air intake cowl of the air intake structure of the engine.

11. Protection device according to claim 1, characterized in that the protective tarpaulin also comprises a tertiary portion fixed to the main portion, said tertiary portion being provided with stiffening means and designed to partially cover the air intake cowl of the engine, to close off each exhaust orifice forming part of a hot air duct and being provided on a lower portion of the air intake cowl.

\* \* \* \* \*